ACYLATED MITOSENES

Original Filed Nov. 8, 1965

M. MATSUI,
Y. YAMADA,
K. UZU,
T. HIRATA AND
S. WAKAKI INVENTORS

BY Wenderoth, Lind & Ponack

ATTORNEYS

United States Patent Office

Re. 27,384
Reissued June 13, 1972

27,384

ACYLATED MITOSENES

Masano Matsui and Yasuhiro Yamada, Tokyo, Keizo Uzu, Shizuoka, and Tadashi Hirata and Shigetoshi Wakaki, Tokyo, Japan, assignors to Kyowa Hakko Kogyo Co., Ltd., Tokyo, Japan

Original No. 3,429,894, dated Feb. 25, 1969, Ser. No. 511,018, Nov. 8, 1965. Application for reissue Dec. 31, 1969, Ser. No. 889,760

Claims priority, application Japan, Nov. 7, 1964, 39/62,806

Int. Cl. C07d *27/80*

U.S. Cl. 260—326.3 12 Claims

Matter enclosed in heavy brackets [ ] appears in the original patent but forms no part of this reissue specification; matter printed in italics indicates the additions made by reissue.

ABSTRACT OF THE DISCLOSURE

Acylated mitosenes having the formula

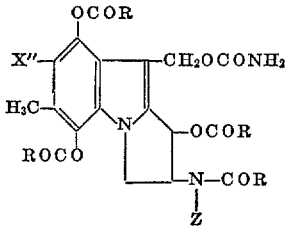

Figure 1:
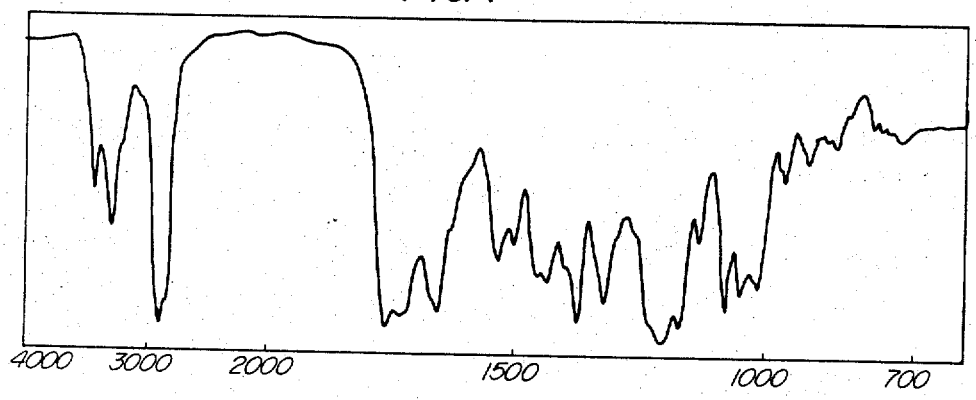

wherein X'' is $OCH_3$, NHCOR or OCOR, R is H or $CH_3$ and Z is H or $CH_3$. These compounds are produced by the reductive acylation of the corresponding mitosene compound. They are useful antibacterial agents.

The present invention relates to novel derivatives of mitomycin and, more especially, to compounds produced by reductive acylation of mitomycin.

In 1956, mitomycin A and mitomycin B—compounds having anti-tumor potency as well as antibacterial activity—were isolated by Hata et al. from a culture medium of Streptomyces caespitosis. Subsequently, Wakaki et al. isolated mitomycin C from a culture medium of the same microorganism. It is known that mitomycin C, which also has anti-tumor and antibacterial activities, is one of the most potent of the known anti-tumor substances. However, its clinical utilization is restricted because of its relatively high toxicity. Thus, as is pointed out on page 687 of The Merck Index, Seventh Edition (1960), published by Merck and Co., Inc., Rahway, N.J., mitomycin C has been used primarily against far advanced malignancies.

It is a desideratum in this art to embody new therapeutically useful compounds which retain the advantages of the mitomycins, particularly those of mitomycin C, e.g. possess the antibacterial potencies thereof, but are free of the disadvantage thereof, namely, are of such reduced toxicity as effectively to broaden the possibilities of use thereof.

The present invention realizes this desideratum by embodying novel acylated mitosenes which are useful inter alia for the purposes for which, e.g., mitomycin C is used and in essentially the same way, but with the elimination of the aspect of undue, and thereby sometimes prejudical, toxicity.

The chemical structure of the mitomycins is as shown by the formula:

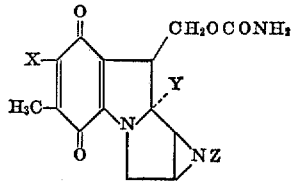

(I)

wherein X, Y and Z have the following significances:

| Mitomycin | A | B | C |
|---|---|---|---|
| X | $CH_3O$ | $CH_3O$ | $NH_2$ |
| Y | $CH_3O$ | HO | $CH_3O$ |
| Z | H | $CH_3$ | H |

The following mitomycin derivatives are also known:

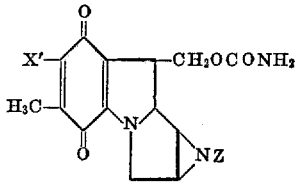

(II)

and

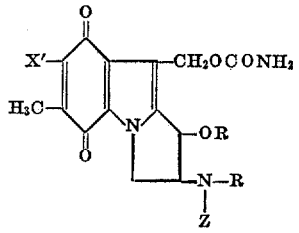

(III)

In Formulae II and III, R represents an aromatic or aliphatic hydrocarbon radical, which may be substituted or unsubstituted, X' is $CH_3O$, $NH_2$ or OH, and Z is $CH_3$ or H. These mitosenes (II) and (III) can be prepared from the corresponding mitomycins as follows:

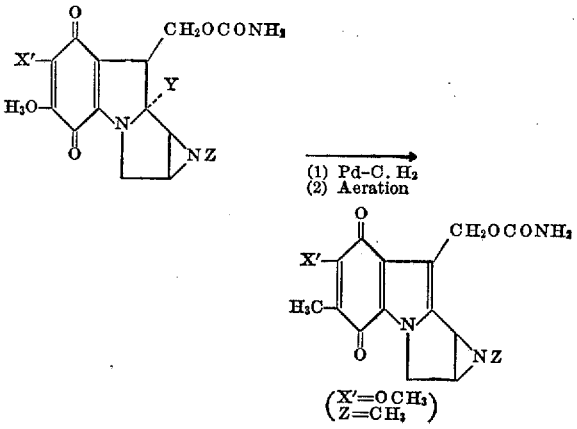

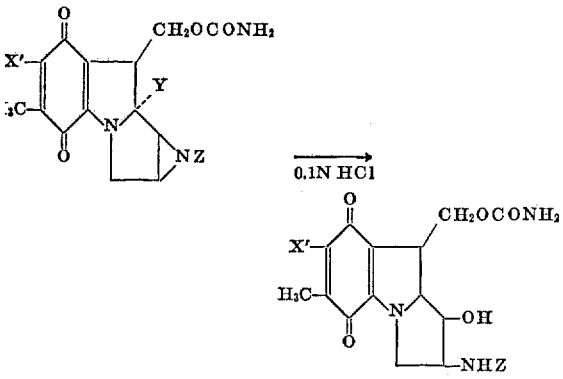

The novel compounds IV (mitosenes) of the present ıvention are prepared by the reductive acylation of the ɔrresponding compounds of Formulae I, II and III.

When according to the present invention, a compound f the Formula I, II or III is concurrently subjected to ıe action of an acylating agent and a chemical reducing gent in pyridine or is subjected to catalytic hydrogenaon in solution in a mixture of an acylating agent and yridine, reductive acylation takes place in accordance ith the following schemes:

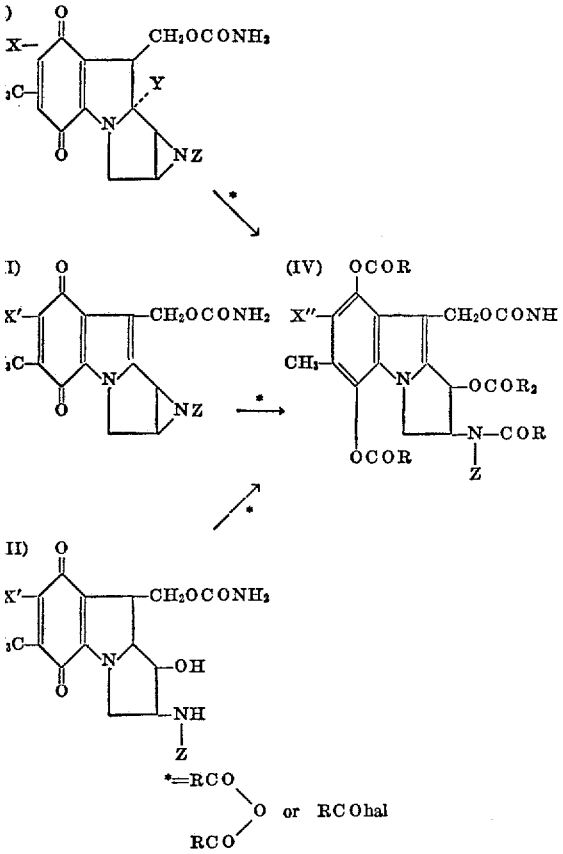

herein

=H or $CH_3$
=$CH_3O$ or $NH_2$
'=$CH_3O$, $NH_2$ or OH
''=$OCH_3$, NHCOR or OCOR
=OH or $OCH_3$
=H or $CH_3$
al=halogen (Cl, Br)

Note that the reductive acylation according to the presıt invention involves the splitting of the aziridine ring ı the cases of starting compounds I and II.

The acylating agent is preferably an acid anhydride or an acid halide, corresponding to the acyl group to be introduced. Preferred in this regard according to the invention are acetic anhydride and acetyl chloride, whereby the acetyl group is introduced into the molecule.

Chemical reducing agents are the so-called moderate reducing agents such as sodium hydrosulfite, although preference is given to zinc in this regard. In the catalytic reduction alternative, use can be made of any of the conventional hydrogenating catalysts such as platinum oxide, rhodium oxide, Raney nickel and the like, but palladium-on-carbon is preferred.

The reactions shown on the foregoing reaction schemes are preferably carried out in a solvent medium, such as pyridine.

Where hydrogen is the reducing agent, the reaction is allowed to proceed until one mole of hydrogen has been adsorbed per mole of starting compound.

Work-up of the reaction mixture is as illustrated in the exemplary embodiments, infra.

Figure 2:
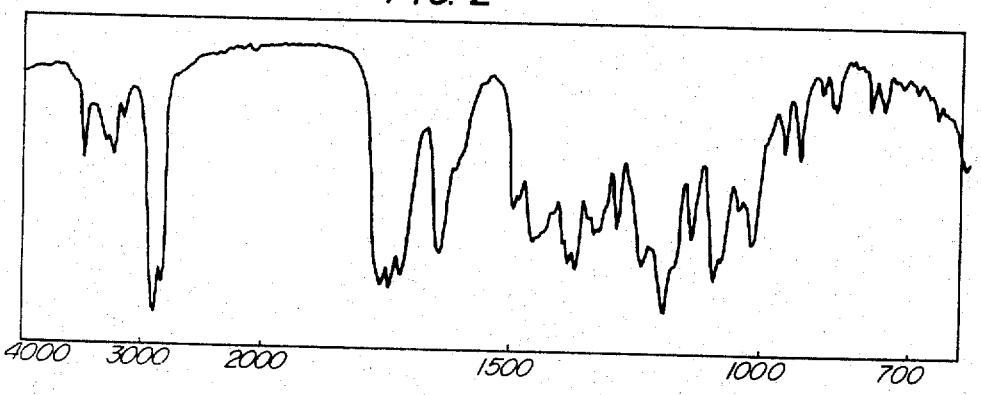

On the accompanying sheet of drawing:

FIG. 1 shows the infrared absorption spectrum of the product of the reductive acetylation of 1 - hydroxy-2-amino-7-hydroxy-mitosene (cf. Example 1); and FIG. 2 shows the infra-red absorption spectrum of the product of the reductive acetylation of 1 - hydroxy-2-methyl-amino-7-methoxy-mitosene (cf. Example 2).

The following examples set forth, by way of illustration, but not of limitation, presently preferred typical embodiments of the invention. In these examples, parts by weight bear the same relation to parts by volume as do grams to milliliters.

Example 1

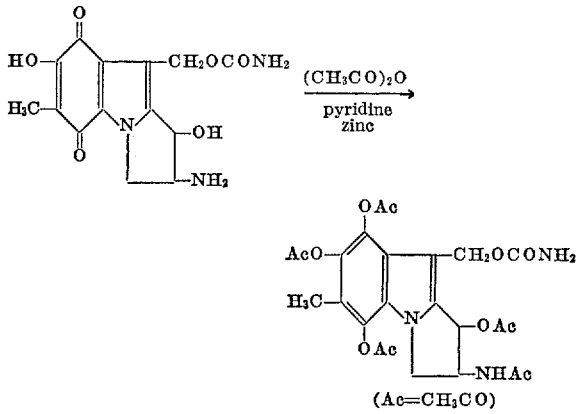

500 parts by weight of 1-hydroxy-2-amino-7-hydroxy-mitosene are dissolved in 10 parts by volume of acetic anhydride and 10 parts by volume of pyridine, to which 500 parts by weight of zinc powder have been added. The mixture is vigorously agitated in ice. The resultant colorless solution is filtered to remove zinc. The filtrate is concentrated under reduced pressure (1 mm. Hg) and the residue is dissolved in ethyl acetate, followed by shaking the solution in water. The ethyl acetate solution is then dehydrated with Glauber's salt, after which it is subjected to silica gel chromatography. The main fraction is first eluted with acetone-ethyl acetate (2:1). 350 parts by weight of colorless pillar-shaped crystals are obtained by concentrating the eluate under reduced pressure.

*Analysis.*—$C_{14}H_{12}O_6N_3(CH_3CO)_5C_{24}H_{27}O_{11}N_3$: Theoretical: C, 54.03; H, 5.10; N, 7.88. Found: C, 53.76; H, 5.02; N, 7.75.

The infra-red absorption spectrum observed in Nujol is as shown in FIG. 1.

Example 2

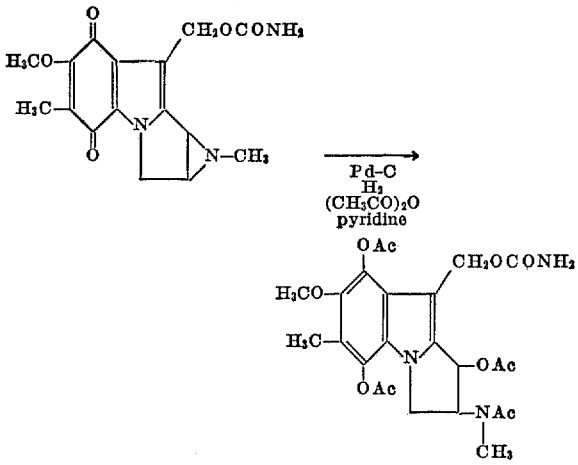

500 parts by weight of 1a-methyl-7-methoxy-aziridino-mitosene are dissolved in 10 parts by volume of acetic anhydride and 100 parts by volume of pyridine. 30 parts by weight of palladium-carbon (containing 5% by weight of palladium) are suspended in the resultant solution, and gaseous hydrogen is bubbled through at room temperature (about 20° to about 35° C.). When 1 mole of hydrogen has been absorbed, the reaction mixture is filtered to remove the catalyst. The filtrate is concentrated under reduced pressure and purified by silica gel chromatography after the manner described in Example 1. 170 parts by weight of colorless needles are obtained.

*Analysis.*—$C_{24}H_{29}O_{10}N_3$: Theoretical: C, 55.48; H, 5.67; N, 8.09. Found: C, 55.20; H, 5.60; N, 8.20.

The infra-red absorption spectrum observed in Nujol is as shown in FIG. 2.

Example 3

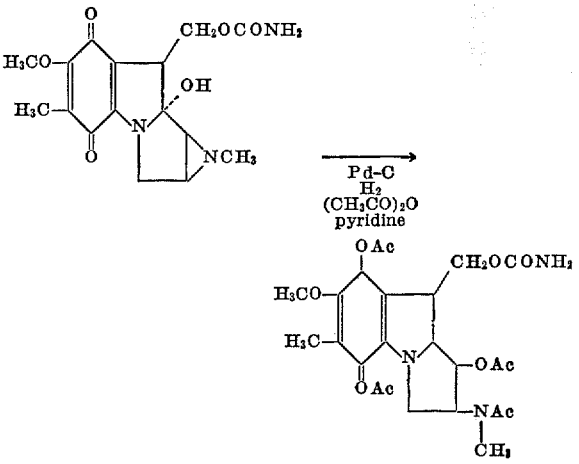

500 parts by weight of mitomycin B are dissolved in 10 parts by volume of acetic anhydride and 10 parts by volume of pyridine to which 300 parts by weight of palladium-carbon had been added. Hydrogenation and silica gel chromatography are carried out in the manner described in Example 2. The thus-obtained product is identical with that obtained according to Example 2.

The compounds IV of the present invention inhibit the growth of a variety of microorganisms, including the following:

Staphylococcus aureus
Sarcina lutea
Bacillus subtilis
Salmonella typhi
Shigella flexneri
Klebsiella pneumoniae Proteus vulgaris
Escherichia coli
Bacillus pyocyaneus
Vibrio comma
Mycobacterium tuberculosis
Streptococcus haemolyticus
Streptococcus faecalis
Diplococcus pneumoniae
Corynebacterium diphtheriae Like mitomycin C itself, the new acylated mitosenes IV of this invention are useful in vitro as antiseptics, i.e. for dsiinfecting; and are also useful in combating topical infections due to pathogenic bacteria, e.g. in cases of staphylodermatitis and the like, and in this connection they may be applied topically or administered internally (e.g. orally).

Examples of formulations—solely illustrative and not at all limitative—using the new compounds IV are as follows:

Example 4

One gram of reductively acetylated 1-hydroxy-2-amino-7-hydroxy-mitosene

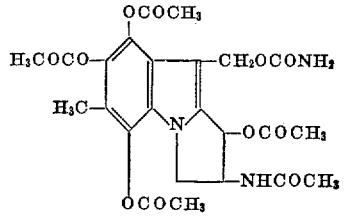

is homogeneously incorporated into about 500 grams of an ointment base (Vaseline). Repeated application of the thus-prepared ointment to topical infections due to Staphylococcus aureus exhibits a curative effect.

The Vaseline may be replaced by any other suitable and desired base, e.g. a vanishing cream base. The 1-hydroxy-7-hydroxy-mitosene can be replaced by any other of the compounds IV of this inventon with like effect.

Example 5

Powder form reductively acetylated 1a-methyl-7-methoxy-aziridino-mitosene, i.e. the compound of the formula

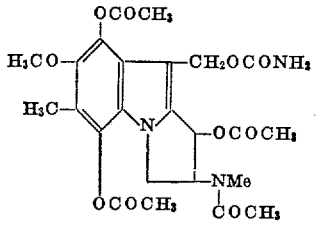

scattered lightly, but uniformly, over raw fish is found to inhibit putrefaction of the latter so that it remains fresh for a prolonged period of time. Any of the other compounds IV of this invention, similarly employed, exhibits a like action.

What we claim is:

1. A compound of the formula

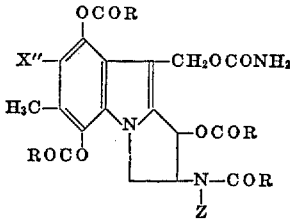

wherein X″ is a member selected from the group consisting of —$OCH_3$, —NHCOR and —OCOR, R is a member selected from the group consisting of H and methvl and Z ; a member selected from the group consisting of H and $-CH_3$.

2. The compound of the formula

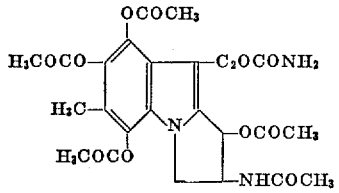

3. The compound of the formula

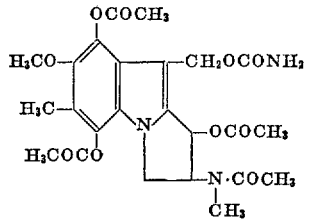

4. A process for the production of a compound of the ormula

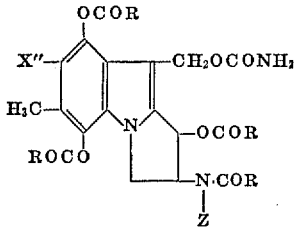

'herein X'' is a member selected from the group consisting of $-OCH_3$ and —NHCOR, and R is a member elected from the group consisting of H and $CH_3$, and is a member selected from the group consisting of H nd $CH_3$, which comprises subjecting the corresponding ompound of the formula

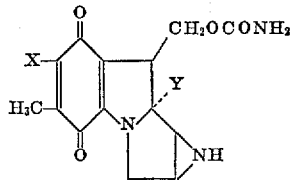

'herein X is a member selected from the group consisting of $CH_3O$— and $-NH_2$, Y is a member selected om the group consisting of —OH and $-OCH_3$, and is as precedingly defined, to reductive acylation with member selected from the group consisting of $(RCO)_2O$ nd RCO.hal, where hal stands for a halogen atom and is as precedingly defined, in the presence of a reducing gent.

5. A process according to claim 4 wherein the reducing agent is a non-catalytic reducing agent.

6. A process according to claim 4 wherein the reducing agent is a catalytic hydrogen.

7. A process for the production of a compound of ie formula

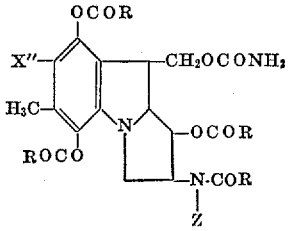

'herein X'' is a member selected from the group consisting of $-OCH_3$, —NHCOR and —OCOR, R is a member selected from the group consisting of H and $CH_3$, and Z is a member selected from the group consisting of H and $CH_3$, which comprises subjecting the corresponding compound of the formula

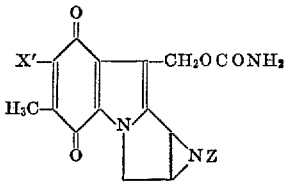

wherein X' is a member selected from the group consisting of $-OCH_3$, $-NH_2$ and —OH, and Z is as precedingly defined, to reductive acylation with a member selected from the group consisting of $(RCO)_2O$ and RCO·hal, where hal stands for a halogen atom and R is as precedingly defined, in the presence of a reducing agent.

8. A process according to claim 7 wherein the reducing agent is a non-catalytic reducing agent.

9. A process according to claim 7 wherein the reducing agent is a catalytic hydrogen.

10. A process for the production of a compound of the formula

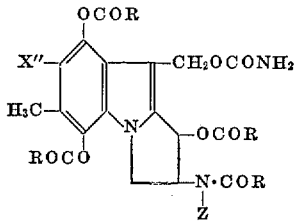

wherein X'' is a member selected from the group consisting of $-OCH_3$, —NHCOR and —OCOR, R is a member selected from the group consisting of H and $CH_3$, and Z is a member selected from the group consisting of H and $CH_3$, which comprises subjecting the corresponding compound of the formula

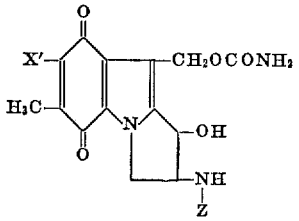

wherein X' is a member selected from the group consisting of $-OCH_3$, $-NH_2$ and —OH, and Z is as precedingly defined, to reductive acylation with a member selected from the group consisting of $(RCO)_2O$ and RCO.hal, where hal stands for a halogen atom and R is as precedingly defined, in the presence of a reducing agent.

11. A process according to claim 10 wherein the reducing agent is a non-catalytic reducing agent.

12. A process according to claim 10 wherein the reducing agent is a catalytic hydrogen.

References Cited

The following references, cited by the Examiner, are of record in patented file of this patent or the original patent.

UNITED STATES PATENTS 3,332,944 7/1967 Cosulich et al. ------ 260—326.3

ALEX MAZEL, Primary Examiner

JOSE TOVAR, Assistant Examiner

U.S. Cl. X.R.

424—274